United States Patent Office 3,238,393
Patented Mar. 1, 1966

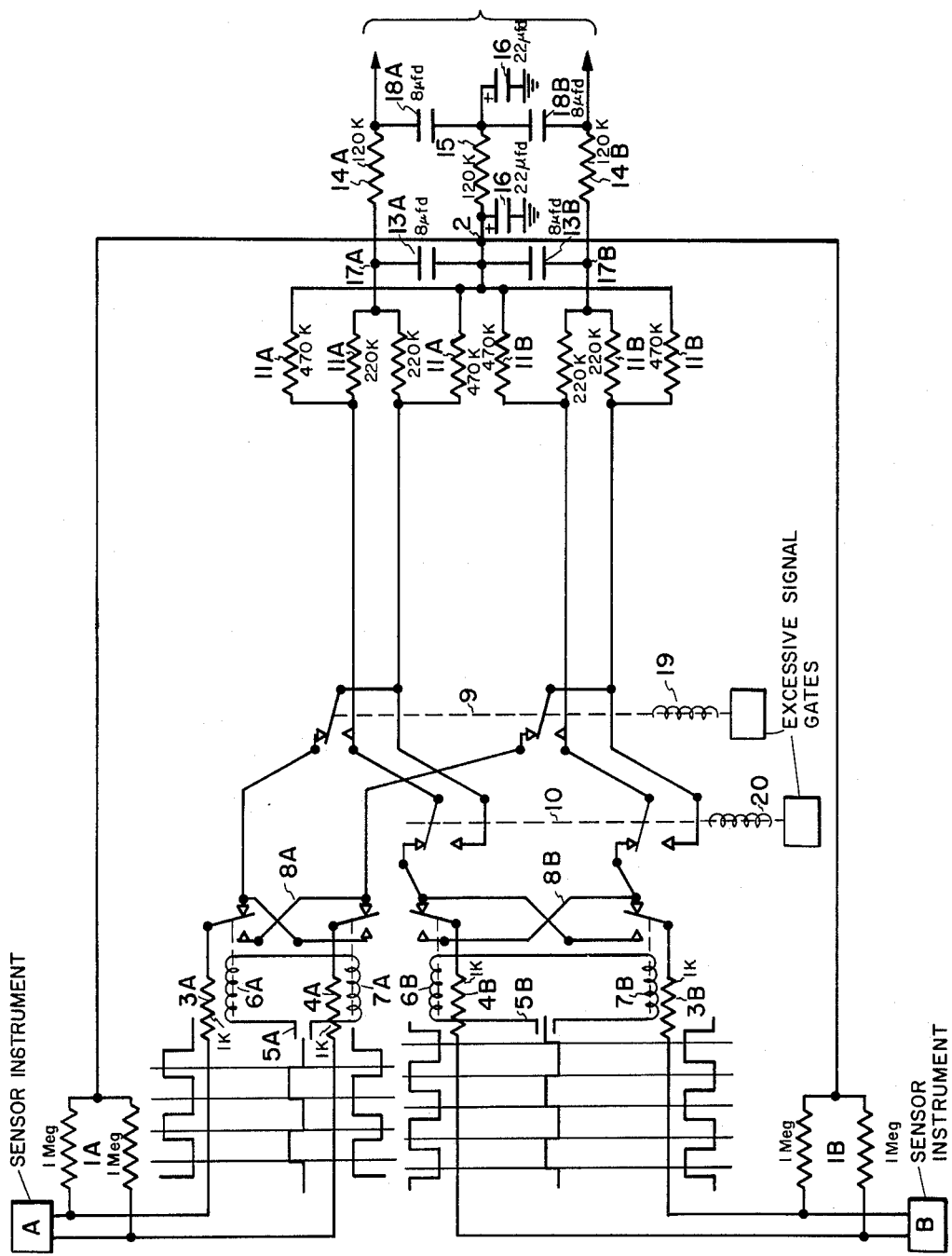

3,238,393
MULTIPLE SWITCHING CIRCUITS
Norman J. Johnson and Monty M. Merlen, Stamford, Conn., assignors to Barnes Engineering Company, Stamford, Conn., a corporation of Delaware
Filed Aug. 17, 1962, Ser. No. 217,599
5 Claims. (Cl. 307—117)

This invention relates to improved processing circuits for multiple instruments such as horizon sensors.

Multiple instruments are used for many purposes particularly to increase reliability either against wearing out or other permanent malfunction of one of the instruments or for intermittent temporary disconnection or disabling of one instrument. Increased reliability produced by redundance is of considerable importance when long periods of unattended operation in unfriendly environments are encountered such as for example, in satellite where guarding against false reading due to temporary, and often necessary, disablement of one instrument is a factor even when the total period of use of the pair of instruments may not be excessively long. Horizon sensors operating in the infrared are typical of the type of instrument referred to and the remainder of the description will deal with horizon sensors as a typical example, it being understood that the processing circuits of the present invention are not concerned with the origin of the signals which they are to process and so the present invention is useful with instruments other than horizon sensors and, therefore, is not limited thereto in its broader aspects.

The operation of typical horizon sensors will be described in connection with a pair of conical scan sensors of Patent 3,020,407 to Merlen dated February 6, 1962. Each horizon sensor produces a conical scan by a rotation of a suitable germanium prism and each horizon sensor produces a detector output which is amplified, centered and finally phase detected and filtered. The sequence of circuits is shown in FIG. 3 of the patent. It should be noted that the phase detector and filter circuits, which are the ones with which the present invention particularly deals, are actuated by pulses from a phase reference generator. These pulses are generated at each end of a vertical line which is oriented with respect to the desired attitude of the vehicle. The phase detectors, which may be of the simple DPDT switch type, switch the detector output signal so that an output is obtained which is a function of any difference in rotational or time intervals between horizon passage and reference pulse. The operation is illustrated in FIGS. 4 to 6 of the patent.

It is customary to provide two sensors at right angles to each other to give information on departure from predetermined attitude about pitch axis and roll axis respectively. If now it is desired to develop one or both sensors into dual pairs to preserve response if one sensor or the other breaks down or is temporarily disabled, for example by receiving a gating signal from a sun presence or a horizon loss circuit which is typically shown in FIG. 3 of the patent, it is necessary that there be a circuit combining the outputs. In the present invention this is preferably done in the filter portion of a phase detector and filter though, of course, it may be in a different type of circuit.

It is important that the information from one of a pair of horizon sensors be of the same nature regardless of whether both sensors are operating or whether one is temporarily or permanently out of action. This is effected by the present invention. Another circuit which can be of known type examines the signals from each sensor head and provides a disabling signal in the case of malfunction. This intentional disablement can also occur for a short period of time as when the horizon sensor sees the sun or loses the horizon.

The great advantages of the redundancy made possible by the present invention are at a maximum when both types of horizon sensors, for roll and for pitch are in pairs. For some installations it is easy to mount a pair of pitch sensors, one on one side of a vehicle and the other on another, whereas pairing of the roll sensors may not be as practical. In such a case there may be paired pitch sensors but only a single roll sensor. Of course, the advantages of the present invention will be obtained only in the pitch information. The invention is not limited, therefore, to having all of the instruments paired.

In addition to the advantages of redundancy resulting from pairing in a more specific aspect the present invention also includes an improved combination filter circuit in which the reliabilty of the circuit components is increased. The pairing feature of the present invention may be used without the improved combination filter circuit. But in a more specific form of the invention both features are included.

The invention will be described in greater detail in conjunction with the drawing which is a schematic of a phase detector and filter circuits as this is the only part of the processing circuits changed by the present invention. The drawing shows particular values of components which represent a typical operating circuit. The invention is, of course, not limited to the exact values set forth.

Detector outputs from two horizon sensors are shown at A and B. As most of the circuits are symmetrical and the same for each sensor their elements will receive the suffix A or B respectively to designate which horizon sensor is concerned.

Relatively high resistance shunts composed of two 1 meg resistors 1A and 1B respectively shunt each sensor output. It should be understood that this is the output after amplification and some processing and in terms of FIG. 3 of the Merlen patent it constitutes the input to the phase detector and filter circuit. The center point of each pair of resistors 1A and 1B, which constitutes 2 meg shunt across the respective inputs, is connected to a floating reference point 2.

Each input passes through relatively low valued resistors 3A and 4A and 3B and 4B to the moving elements of DPDT switches 8A and 8B. The wave shapes are shown on each side of their respective connectors and are square waves.

The switches 8A and 8B are actuated by coils 6A and 7A and 6B and 7B receiving a square wave at their input 5A from reference signal generators on the horizon sensors. The shapes of these reference square waves are indicated on the drawing and the vertical lines indicate the point of switching. It will be seen that these switching points are not in the center of the square waves of horizon sensor inputs to the switches. This represents a situation where the vehicle is tilted and so produces a signal which, after integration as will be described below, produces an error signal. If there were no tilt the switch points would be in the center of each square wave in which case a zero final output signal results. This effect of switching at different points on the square wave is exactly the same as is shown in FIG. 5 of the Merlen patent and this portion of the processing circuits, though necessary to the operation of the present invention, is not changed thereby from the configuration shown in the Merlen patent.

The outputs from the switches 8A and 8B pass through SPDT switches 9 and 10 respectively. These two switches are interconnected as is shown on the drawing and will be described later. The outputs lead into a series of integrating circuits which are formed of the resistors 11A and 11B and the capacitors 13A, 13B and 16. The 220K resistors of each pair integrate with the capacitors 13A and 13B respectively while the 470K resistors integrate in connection with the capacitor 16. The integration by the circuits containing capacitors 13A and 13B result in integrated signals at points 17A and 17B respectively. The integration with the circuits including capacitor 16 produces an integrated signal appearing at point 2. In positions of the relays 9 and 10 where no signal is introduced into the resistors 11A and 11B there will still be an integrated signal produced by the much higher valued resistors 1A and 1B. This signal appears at point 2 where the circuits producing it include the capacitor 16. These circuits are provided with additional integration sections formed of resistors 14A and 14B and capacitors 18A and 18B. These latter capacitors are connected to point 2 by a resistor 15 the two ends of which are bypassed to ground through the capacitors 16. The resistor 15 and the right-hand capacitor 16 constitute a second integrating section for the signal at point 2.

The path of the signals will now be traced for each horizon sensor. One side of the line connects through the upper right hand contact of a switch 8A, the upper contact for the top pole of switch 9 through the 220K resistor 11A to the point 17A. The mirror image input connects from the lower right-hand contact of switch 8A to the upper contact of the lower pole of switch 9. This in turn leads through a 220K resistor 11B to the point 17B. When the switch 8B is in the position shown the signal from sensor B goes through another 220K resistor of the 11A series to 17A and the lower right-hand corner contact of the switch 8B to a 220K resistor of the 17B series to point 17B. The connection is through switch 10 instead of through switch 9.

Now consider the actuation of switches 8A and 8B by pulse from the reference signal generators 5A and 5B. 8A reverses itself to the opposite position and the inputs from horizon sensor A to points 17A and 17B are reversed. The same thing happens when switch 8B is actuated and reverses the connections. It will be noted that each time the signals from the two horizon sensors are introduced in parallel. If the average voltages of the signals are equal, as is normally the case when the two sensors are operating properly, the voltages at 17A and 17B and, of course, correspondingly the integrated voltages at the output arrows will be equal to the average voltage of the signal from either sensor alone.

Now let us assume that one of the horizon sensors A sees the sun. When mounted on opposite sides of a vessel normally it is not possible for both horizon sensors to see the sun at the same time. If one sensor sees the sun the other does not (which is not the normal operation where neither sees the sun) the sun presence circuit which is shown in FIG. 3 of the Merlen patent sends a gating signal to the solenoid coil 19 of switch 9. The switch is actuated against its normal spring pressure and signals from horizon sensor A are cut off. However, this makes no difference to the output signal for the signal from horizon sensor B is integrated and the output is of the same value of D.C. and the same polarity as if both horizon sensors were operating properly. Obviously if sensor B sees the sun the same operation takes place but, of course, this time it is the solenoid 20 of switch 10 which receives the disabling signal from the instrument shown diagrammatically on the drawings and which is a source of a gating signal when the instrument receives signals greater than normal, a sun gate in the case of a horizon sensor, or less than normal, which occurs in a horizon sensor after the sensor loses the horizon. The operation is exactly the same as in connection with the solenoid coil 19 and the gating circuits are shown in block diagram form in FIG. 3 of the Merlen patent as referred to above. The same result occurs if either horizon sensor loses the horizon and the gating signal actuates switch 9 or switch 10 as the case may be.

Let us now assume a situation where horizon sensor B malfunctions and either puts out no signal at all or a much lower signal. If the malfunctioning is in or before the preamplifier shown in the Merlen patent and no signal or substantially no signal results the horizon loss circuit of the patent is actuated and switch 10 cuts out the signal from horizon sensor B. Any signal between the level at which the horizon loss circuit is actuated and that at which the sun presence circuit functions is limited in the amplifiers so that its level is constant. Redundancy is complete and the reliability of the overall system is markedly increased.

So far only the first feature of the invention has been described, namely the unimpaired operation of the system with one horizon sensor disabled. This is of importance regardless of the characteristics of the integrating circuit. Thus, for example, if the point 2 were ground the same continued operation with one horizon sensor disabled will result. However, as illustrated the integrating circuit is substantially improved in reliability or the same reliability can be obtained with cheaper components as will now be described.

If the integrating circuit instead of connecting the capacitors 13A and 13B and 18A and 18B to points 2 and the other end of resistor 15 respectively which are the average of all of the voltages both were connected to ground as in standard integrating circuits any leakage in these capacitors will decrease the integrated signal. The capacitors are of large size typically shown as 8 mfd., and development of leakage can occur in long continued operations or with high temperature. The present invention returns these capacitors to a floating potential point 2 and within considerable limits leakage will be greatly decreased as a minimum potential difference exists across the capacitors. There is thus provided a great additional protection against malfunction if capacitor leakage develops. It would be possible to take advantage of this improvement by obtaining the same reliability with much cheaper capacitors. However, in many uses in which the present invention is involved one is dealing with precision instruments and the cost of higher grade capacitors is ordinarily negligible in the total cost of the instrument. Therefore, ordinarily this improvement of the present invention will be utilized with the best available capacitors to increase greatly the reliability. Thus, for example, even though the voltages involved are very small, high grade, capacitors should be used with a voltage rating greatly in excess of the working voltage. For example, with the values given in the drawing capacitors with working voltages of 200 or more volts would be an appropriate choice. Capacitors 16 do not significantly influence the signal if they develop slight leakages. They are merely bypass condensers and although advantageously chosen of high quality they present no particular problem in component selection.

One small but practical point merits brief mention. It will be noted that the resistors 3 and 4 A and B have comparatively low value. These resistors really do not enter into the operation of the present invention. They are, however, included for overload safety protection of the switches 8A and 8B. Their value is in no sense critical but should, of course, be very small compared to the other resistors in the circuit.

We claim:
1. Electronic switching and integrating circuits for dual instruments having rectangular wave output, synchronous phase signal generators and separate average level signal outputs comprising in combination,
  (a) two phase detection circuits which have reversing output characteristics, said phase detection circuits respectively having connection to the instrument outputs and being actuated by the phase signal generators,
  (b) dual integrating circuits having a common center point and each being connected to multiple input resistors,
  (c) equal, relatively high, resistance shunts across the inputs of the phase detector circuits said high resistance shunts having center taps, connecting means from the center taps to the central point of the integrator circuits,
(d) switching means connecting the inputs of the dual integrating circuits to the outputs of phase detection circuits whereby voltage output from the integrating circuit from a single instrument is the same as from two instruments operating simultaneously.

2. Circuits according to claim 1 in which the dual instruments are dual horizon sensors.

3. Circuits according to claim 1 in which the capacitors of the integrating circuits are connected to a point which in turn is connected to the center point of high resistance shunts across the inputs of the two phase detection systems whereby potential difference across the capacitors is minimized.

4. Circuits according to claim 3 in which phase detection circuits are synchronous reversing switches.

5. Circuits according to claim 1 in which phase detection circuits are synchronous reversing switches.

References Cited by the Examiner

UNITED STATES PATENTS

| | | | |
|---|---|---|---|
| 1,922,059 | 8/1933 | Ohl | 340—147 |
| 2,936,442 | 5/1960 | Christman et al. | 340—147 |
| 3,020,407 | 2/1962 | Merlen | 250—83.3 |

ROY LAKE, *Primary Examiner.*

ALFRED L. BRODY, *Examiner.*